United States Patent [19]
Arney et al.

[11] Patent Number: 5,829,809
[45] Date of Patent: Nov. 3, 1998

[54] MULTI-DUMP FIRE FIGHTING BUCKET

[75] Inventors: Donald Brian Arney, 3659 Bamfield Drive, Richmond, British Columbia, Canada, V6X 3B4; Peter Leighton Brooke, Delta; Norman Carter Wagner, North Vancouver, both of Canada

[73] Assignee: Donald Brian Arney, Richmond, Canada

[21] Appl. No.: 863,327

[22] Filed: May 27, 1997

[51] Int. Cl.⁶ ..................................................... A62C 3/02
[52] U.S. Cl. .......................... 294/68.21; 169/53; 244/136
[58] Field of Search ............................... 294/68.2, 68.21, 294/68.22; 169/53, 34; 244/136

[56] References Cited

U.S. PATENT DOCUMENTS

| | | | |
|---|---|---|---|
| 3,485,302 | 12/1969 | Thorpe | 169/53 |
| 3,572,441 | 3/1971 | Nodegi | 169/2 |
| 3,661,211 | 5/1972 | Powers | 169/2 R |
| 3,710,868 | 1/1973 | Chadwick | 169/2 A |
| 3,754,601 | 8/1973 | Linkewich | 244/136 |
| 4,474,245 | 10/1984 | Arney | 169/53 |
| 4,576,237 | 3/1986 | Arney | 169/53 |
| 4,671,472 | 6/1987 | Hawkshaw | 244/136 |
| 5,560,429 | 10/1996 | Needham | 169/53 |
| 5,692,868 | 12/1997 | Riemersma | 294/68.21 |

FOREIGN PATENT DOCUMENTS 1516128  10/1989  U.S.S.R. .

OTHER PUBLICATIONS

Copies of pp. 35, 36, 45 and 47 of Bambi Bucket (Registered ™) Operator's Manual Published 21 Oct., 1992, by Sei Industries Ltd., Delta, British Columbia, Canada.

Primary Examiner—Dean Kramer

[57] ABSTRACT

A suspendible bucket apparatus is for use with an aircraft to permit dumping of two or more separate loads of water from a single filling of the bucket. The apparatus has an outer bucket with an outer dump valve and an inner bucket with an inner dump valve, inner bucket being located within the outer bucket. At least a portion of the inner bucket is spaced inwardly from the outer bucket to provide clearance therebetween for filling the outer bucket. The dump valves are flexible sleeve valves which are operable independently of each other and in sequence so that the outer dump valve is opened before the inner dump valve.

23 Claims, 13 Drawing Sheets

MULTI-DUMP FIRE FIGHTING BUCKET

BACKGROUND OF THE INVENTION

The invention relates to a fire fighting bucket, particularly a helicopter-carried fire fighting bucket which is easily collapsible for transportation, and which can release at least two separate discharges of liquid.

Fire fighting buckets for carrying by helicopter are well known, and typical buckets are disclosed in U.S. Pat. Nos. 4,474,245 and 4,576,237, in which the inventor is Donald B. Arney, one of the inventors herein. Improvements to the bucket shown in these patents have been devised over the years, and some of these improvements are shown in U.S. Pat. No. 5,560,429 (Needham). The buckets of the three U.S. patents eliminated plunger-type valves or gate valves which were used in some prior art fire fighting buckets and required complex mechanical devices to open and close the valves, typically hydraulic or electrical devices which were heavy and prone to failure. In addition, such plunger-type valves interfered with smooth discharge of water through the valve, causing considerable agitation of the water and lateral dispersion during discharge, which resulted in excessive evaporation in high temperature fire fighting applications.

All of the above patents disclose fire fighting buckets made of a pliable fabric material having an open upper end with a rim which is held open to facilitate filling from an open body of water. The bucket has a tubular extension or sleeve also made of pliable material which extends around an opening adjacent the bottom of the bucket to a free end formed with a discharge port to serve as a "sleeve type" dump valve. The discharge port has a circumferential sealing lip made of soft resilient material which forms two opposite lip portions which are brought into sealing engagement with each other to minimize water leakage from the tubular extension when the sleeve is held raised within the bucket, with the lips positioned below the surface of water in the bucket.

To dump the water, the sleeve is released to fall quickly through the opening in the bottom of the bucket, and the lip portions are opened essentially simultaneously under weight of the water, permitting a rapid discharge of all the water with negligible obstruction. The sleeve is as short as possible to simplify opening and closing of the valve. In contrast with prior art plunger-type valves, the patented sleeve valves permit rapid discharge of a cohesive column of water with negligible agitation or lateral dispersion of the water, thus alleviating evaporation problems associated with plunger-type prior art valves.

The patented buckets above have been very successful, and are made in a wide range of sizes, the upper limit of which is dependent upon the carrying capacity of the helicopter. The dump valve is a single action valve, and it cannot be closed during discharge and thus the bucket releases all its load in a single discharge and is termed a "single dump" bucket. Clearly, with this structure, it is not possible to retain some of the water in the bucket for a second or third discharge without re-filling the bucket. Particularly with the larger capacity of buckets, it has been found that it is not necessary to release all the water to extinguish a relatively small fire. Dumping an unnecessarily large amount of water on a relatively small fire results in inefficient use of water and helicopter time, particularly if the water source is a relatively long way from the dump site. In such circumstances it would be an advantage to have a bucket in which only a portion of water is released in the first discharge, and the remaining portion of the water can be released in second, third or more discharges.

Some prior art buckets using plunger-type valves are capable of two or more dumps from a single load, and are termed "multi-dump" buckets. The dumping occurs sequentially and is accomplished by closing the valve shortly after opening it, and then re-opening it at an appropriate time. However, these valves are relatively slow to open and close which tends to "waste" water, and compensation for time lags is required.

SUMMARY OF THE INVENTION

The present invention reduces the difficulties and disadvantages of the prior art by providing a fire fighting bucket with sleeve-type dump valves which are capable of dumping water in two or more separate discharges without re-filling between discharges. This enables a relatively large bucket to dump a portion of its load on a relatively small fire, and to dump remaining portions of its load at other locations. Because the present invention uses sleeve-type dump valves, water is discharged as a cohesive column similar to the previously described sleeve-type dump valve discharges, with little time delay and reduced mechanical complexity when compared with prior art multi-dump buckets using plunger-type valves.

A suspendible bucket apparatus according to the invention comprises an outer bucket, an inner bucket, an outer dump valve actuator and an inner dump valve actuator. The outer bucket has a bucket wall with upper and lower wall portions, and an outer dump valve. The upper wall portion has an outer rim and the lower wall portion cooperates with the outer dump valve. The inner bucket has a bucket wall with upper and lower wall portions and an inner dump valve. The upper wall portion has an inner rim and the lower wall portion cooperates with the inner dump valve. The inner bucket is located within the outer bucket so that at least a portion of the inner rim is spaced inwardly from the outer rim to provide clearance therebetween for filling the outer bucket. The inner dump valve is located above the outer dump valve. The outer dump valve actuator cooperates with the outer dump valve to control actuation of the outer dump valve, and the inner dump valve actuator cooperates with the inner dump valve to control actuation of the inner dump valve.

In addition, the outer dump valve and the inner dump valve actuators are operable independently of each other and sequentially so that the outer dump valve is opened before the inner dump valve. The outer dump valve is a flexible sleeve having a proximal end portion cooperating with the lower wall portion of the outer bucket, and a distal end portion which is sealable to prevent leakage therethrough. The inner dump valve has a discharge opening which is positionable within the inner bucket to prevent leakage therethrough.

Preferably, the bucket walls of the inner and outer buckets are flexible to permit folding thereof and a rim opener is provided to open the buckets for deployment. The rim opener cooperates with at least one of the rims of the buckets to open the buckets to permit filling thereof. In addition, a draw loop cooperates with a set of rim connectors which are circumferentially spaced apart around the inner rim. The draw loop has a circumference which is less than circumference of the inner rim to distort the inner rim to produce the said clearances between the inner and outer bucket for filling the outer bucket.

In one embodiment, the inner bucket is smaller than the outer bucket. In addition, the inner dump valve is a flexible sleeve having a proximal end portion cooperating with a lower wall portion of the inner bucket, and a distal end portion which provides the said discharge opening which has a diameter less than the diameter of the flexible sleeve of the outer dump valve. The inner dump valve is positionable to discharge liquid into the outer dump valve with negligible contact of discharged liquid onto the lower wall portion of the outer bucket.

In a second embodiment, the bucket wall of the inner bucket is approximately equal in size to the bucket wall of the outer bucket, and the discharge opening of the inner dump valve is a circular opening approximately equal in size to a corresponding opening in the outer bucket adjacent to the proximal end portion of the flexible sleeve of the outer dump valve.

In a third embodiment, an intermediate bucket is disposed beneath the inner bucket and between the inner and outer buckets. The intermediate bucket has an intermediate dump valve having a discharge opening positionable within the intermediate bucket to prevent leakage therethrough. The intermediate dump valve actuator cooperates with the intermediate dump valve to control actuation of the intermediate dump valve.

In a fourth embodiment, the inner bucket is a primary inner bucket which is located within an upper portion of the outer bucket and the inner rim thereof has distal and proximal rim portions. The apparatus further comprises a secondary inner bucket having a bucket wall with upper and lower wall portions, and a secondary inner dump valve. The upper wall portion has an inner rim with distal and proximal rim portions and a lower wall portion cooperates with a secondary inner dump valve. The primary and secondary inner buckets are located side-by-side within the upper portion of the outer bucket so that the proximal rim portions of the inner rims of the primary and secondary inner buckets are generally adjacent to each other. At least some distal portions of the said inner rims of the primary and secondary inner buckets are spaced inwardly from the outer rim of the outer bucket to provide the clearance therebetween for filling the outer bucket.

A detailed disclosure following, related to drawings, describes several embodiments of the invention, which is capable of expression in structure other than that particularly described and illustrated.

DETAILED DESCRIPTION

FIGS. 1–4

A first embodiment of a "double-dump" fire fighting bucket apparatus 10 according to the invention bears many similarities to earlier "single-dump" fire fighting buckets as disclosed in the aforementioned U.S. Pat. Nos. 4,474,245; 4,576,237; and 5,560,429, the disclosures of which are incorporated herein by reference. A brief description of some prior art aspects of the bucket follows, and additional details can be found from the above references.

Figure 1:
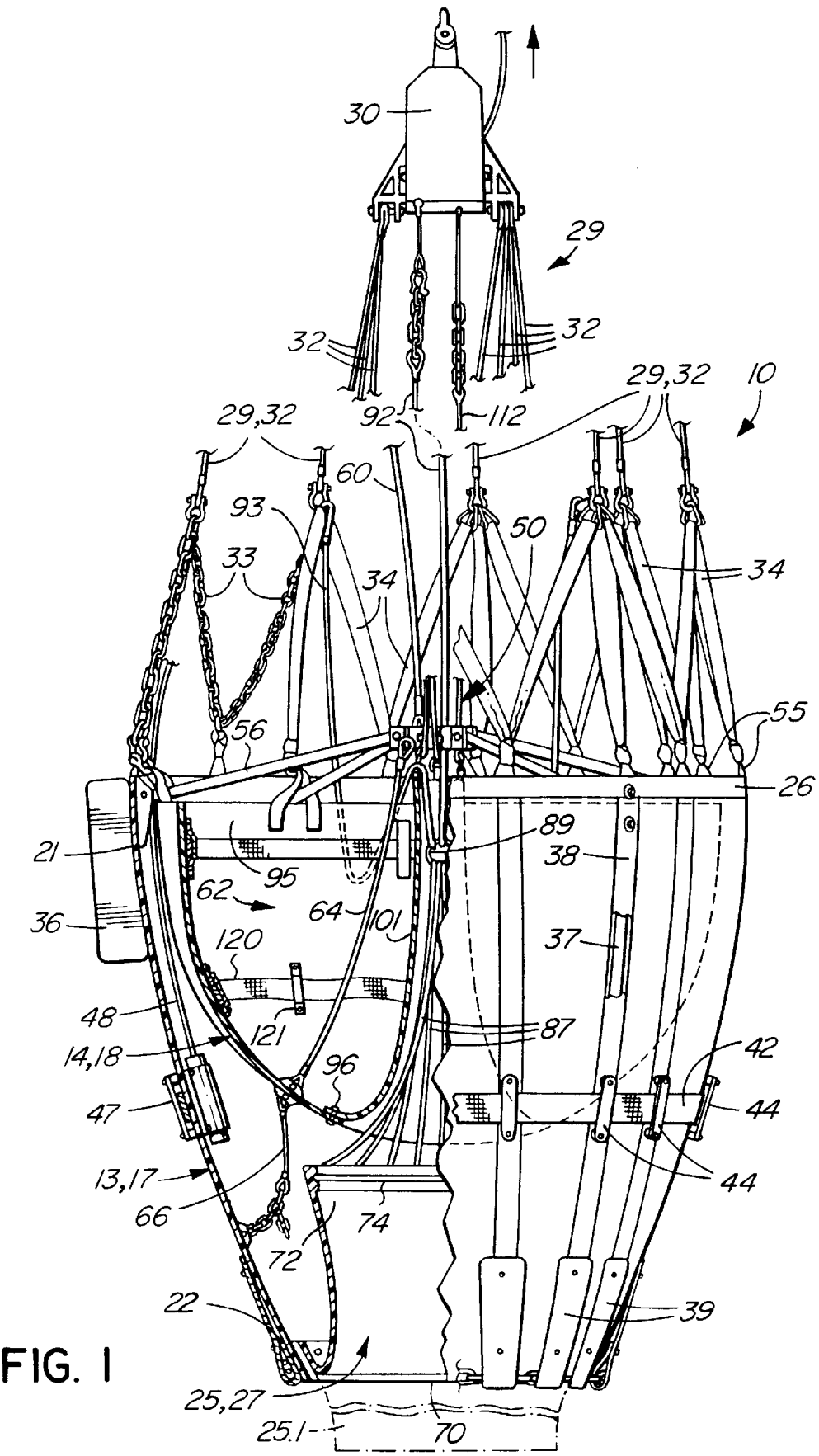
FIG. 1 is a simplified, fragmented, partially sectioned side elevation of a "double-dump" bucket apparatus according to the invention shown empty with inner and outer dump valves thereof closed, with a control head for connecting to a helicopter.

Referring to FIG. 1, the bucket apparatus 10 has outer and inner buckets 13 and 14 respectively, the outer bucket 13 being very similar to the buckets of the prior art patents above. The inner bucket bears many similarities to the outer bucket, but is in addition to the outer bucket and provides the advantage of a second container of water which is controlled separately from the outer bucket so as to permit two separate releases or "dumps" of water, which can be dumped at different times. This enables better distribution or timing of liquid dumped from a single load carried by the helicopter and distinguishes the present invention from the prior art patents. The outer and inner buckets have bucket walls 17 and 18 respectively which are made of a similar tough pliable material, for example, a vinyl impregnated woven synthetic fabric. In the description following, the outer bucket 13 will be described first, with its related structure, and will be seen to closely resemble the structure of buckets disclosed in the above patents.

The bucket wall 17 of the outer bucket has upper and lower wall portions 21 and 22, the upper wall portion having an outer rim 26 defining a top edge of the bucket apparatus. The bucket 13 has an outer dump valve 25 which is a tubular extension or generally cylindrical sleeve 27 made of pliable material, which can be lighter than the material of the bucket wall to improve flexibility. The valve 25 is shown partially and in a raised or closed position extending upwardly into the bucket from an opening adjacent the lower wall portion 22. As will be described with reference to FIGS. 12A through 12C, the outer dump valve 25 can be released to assume a lowered or open position shown in broken outline of 25.1, in which position it forms an axial extension of the lower wall portion of the bucket and permits smooth and rapid discharge of water from the bucket.

The bucket apparatus 10 also includes a harness 29 for suspending the bucket apparatus from an aircraft, e.g. a helicopter, not shown, the harness comprising a control head 30 which also serves as a connector for connecting to the aircraft. The control head also connects to a plurality of support cables 32 which connect with support chains 33 and inclined flexible fabric straps 34 disposed in a zig-zag fashion around and extending upwardly from the outer rim 26 to connect with the plurality of cables 32. The cables 32 thus support essentially most of the weight of the bucket, with a small balance of the weight being carried by other flexible lines or cables as will be described.

The chains 33 are located on one side only of the bucket and in addition, the upper rim has a weights 36 secured to a portion thereof adjacent the chains 33. The chains and weights unbalance the bucket when supported on a surface of a body of water, so that the bucket topples sideways to facilitate rapid filling of the bucket over the rim. When the bucket is dragged through the water for filling, the chains and weights assume a position at the lowest part of the bucket, and thus are prone to contact obstructions in the water. The chains offer more abrasion resistance than the fabric straps when contacting such obstructions, but otherwise function essentially identically to the straps 34. The weights also have good abrasive resistance while dragging the bucket during filling, and when handling the bucket on the ground as the bucket always assumes a position with the weights at the lowest portion.

The bucket wall 17 is stiffened by a plurality of longitudinal battens 37 fitted within complementary sleeves 38 secured to the bucket wall. The battens stiffen the bucket between the rim and dump valve, and yet permit bulging of the wall when the bucket is filled with water, as will be described with reference to FIGS. 12A–12C. As described with reference to the said U.S. Pat. No. 4,474,245, the battens have sufficient stiffness to resist bulging when the pilot pulls the bucket up slowly through the water, and yet can bulge outwardly when the pilot pulls the bucket up quickly, thus increasing the volume of water collected in the bucket when compared with a slow pull. Upper portions of the battens are secured to the rim 26, which is suitably reinforced with heavy duty webbing or straps, and lower portions of the battens are secured to the lower wall portion which is protected by wear-resisting strips 39 secured to the lower wall portion. An external cinch strap 42 extends circumferentially around an intermediate portion of the bucket wall and is located axially by a plurality of locators 44 which are secured to the battens to permit circumferential movement of the cinch strap. The cinch strap has a buckle, not shown, which permits adjustment of the length of the strap so as to control circumference of the bucket adjacent the strap which limits overall capacity of the outer bucket.

A valve sequencer switch 47 is secured to an inner surface of the outer bucket wall 17 at a position as shown and is responsive to water within the outer bucket. The valve sequencer switch can be a float switch or other electrical switch which is open when immersed in water within the outer bucket. Electrical wires 48 extend upwardly from the switch to an electrical circuit which controls the control head as will be described with a reference to FIG. 12. As will be described, the inner bucket has an inner dump valve, and the dump valves are operable independently of each other and sequentially. The valve sequencer ensures that the inner dump valve is only opened after the outer dump valve is opened and cooperates with the outer bucket to detect when the outer bucket has been emptied to permit opening of the inner dump valve. This ensures that the bucket will deliver two separate loads, although if the outer and inner dump valves are actuated essentially simultaneously, the result would be an essentially continuous extended discharge of two loads with little break between each load. The valve sequencer is thus an electrical switch which is responsive to a pre-determined minimum water level in the outer bucket.

Figure 2:
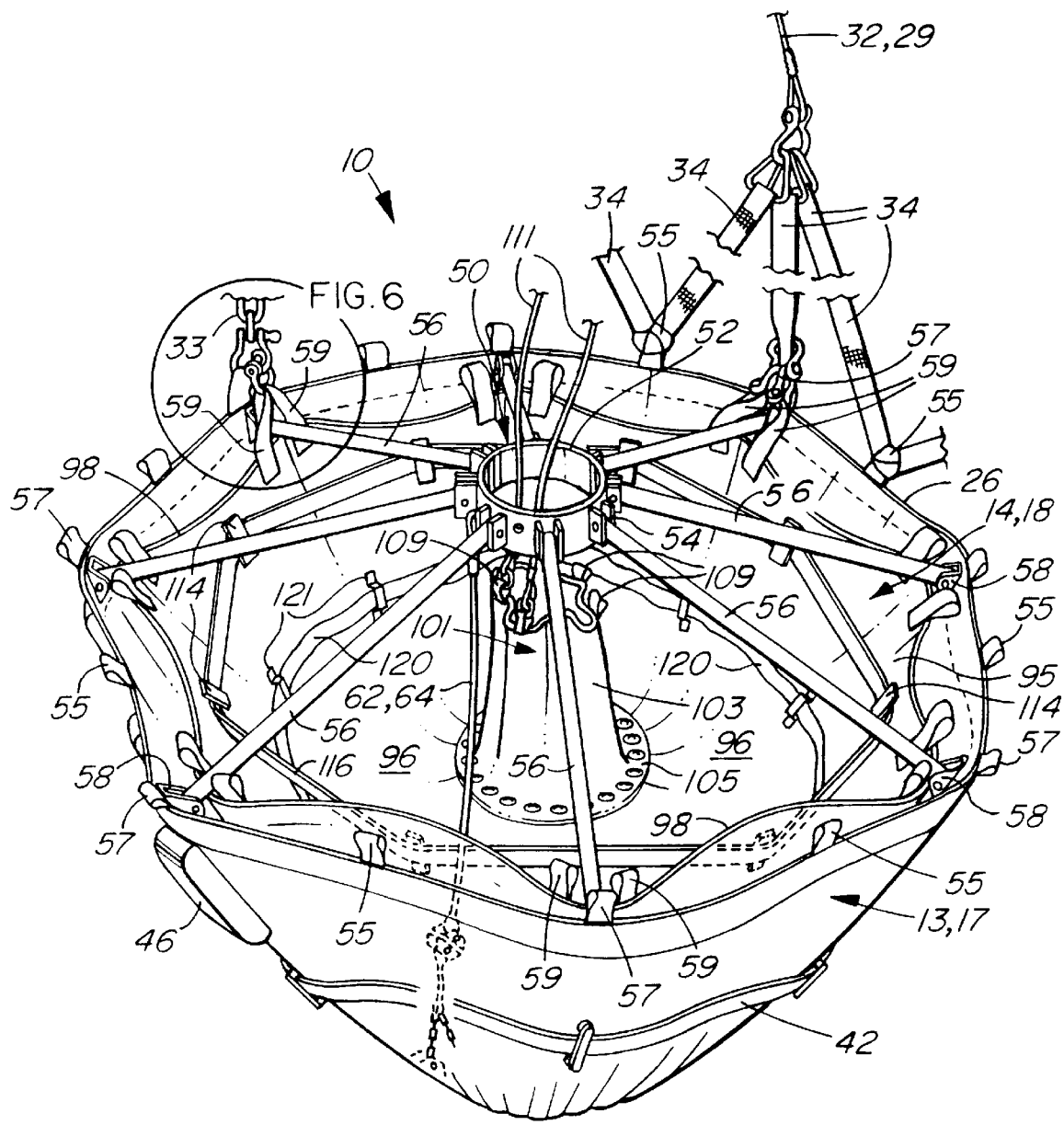
FIG. 2 is a simplified fragmented top perspective of the bucket of FIG. 1.

As also seen in FIG. 2, the bucket has a rim opener 50 cooperating with the outer rim 26 to open the bucket to permit filling thereof as will be described. The rim opener has a central hub portion 52 which is a ring with an inner bore to receive cables as will be described, and an outer surface fitted with a plurality of outwardly extending hub connectors 54 spaced circumferentially therearound. The rim opener 50 further includes a plurality of spokes 56 which have undesignated inner ends hinged to the hub connectors 54, and undesignated outer ends hinged to respective rim connectors 58 extending inwardly from the outer rim 26 at locations spaced circumferentially apart around the outer rim of the outer bucket at locations of the battens. The hub connectors 54 and rim connectors 58 are simple hinge portions comprising a pair of flanges having openings to receive a pin which passes through a corresponding opening in an adjacent end of the spoke. Outer bucket looped webbing straps 55 extend upwardly from the outer rim 26 at locations spaced equally and circumferentially apart around the outer rim and connect through the inclined flexible fabric straps 34 to the harness 29 to support the outer bucket. Similarly spaced outer bucket looped webbing straps 57 connect through similar inner bucket looped webbing straps 59 and the straps 34 or equivalent chains 33 as will be described with reference to FIG. 6. The rim opener 50 is described in the said U.S. Pat. No. 5,560,429, which is distinguished from the two earlier patents in which the rim of the prior art bucket was stiffened by a plurality of battens or stiffeners.

The rim opener acts somewhat similarly to a folding umbrella and serves to automatically and essentially instantly open the bucket for deployment to ensure that the rim is maintained open at all times when deployed. The opener also stabilizes the rim against excessive deflection when the bucket falls to one side when being lowered on a body of water. Additionally, the rim opener prevents the bucket from flattening or "pancaking" when the water has been fully discharged, in which condition the bucket has the tendency to catch the wind and drift upwardly into the tail boom of the helicopter. When an empty bucket is maintained rigidly open, it catches the wind and serves generally as a "drogue" parachute which is stabilized and does not oscillate unduly beneath the helicopter. The spokes have equal lengths such that, when the said rim is essentially fully opened, the spokes are disposed generally radially to each other, and disposed slightly out of a diametrical plane containing the rim. Preferably, the central hub is located slightly above the rim, so that the spokes are within a shallow theoretical truncated cone and thus are generally "over-centred" with respect to the rim.

The hub portion 52 is located vertically by a rim opening line 60 (FIGS. 1 and 4) extending upwardly from the hub, and a rim opener restrainer 62 extending downwardly from the hub. The line 60 extends from the hub to the control head 30 and has a length which is adjusted, so that when the line 60 is taut, the hub portion is raised somewhat above the level of the rim 26 as shown. When the bucket is deployed, the line 60 pulls upwardly on the hub portion as the opener restrainer 62 becomes taut, to ensure rapid opening of the rim of the bucket and holding the rim open by the said "over-centering" action.

The opener restrainer 62 is somewhat slack when the bucket is empty as shown, and as the bucket fills the side walls move outwardly so as to "take-in" the slack and to make the opener restrainer taut when the rim portion is raised as shown. The opener restrainer 62 has an inner opener restrainer link 64 extending downwardly from the hub portion 52 to the inner bucket 14, and an outer opener restrainer link 66 connected to extend between the inner bucket 14 and the outer bucket 13 as shown. The outer opener restrainer link 66 has an upper end generally adjacent to a lower end of the inner opener restrainer link 64, and the said upper and lower ends are effectively connected together through the inner bucket as shown through reinforcing brackets and sealed fasteners which transfer loads between the links 64 and 66 to serve as a continuous link and relieve the inner bucket of excessive load. The link 66 also includes a short length of link chain which is connected to the bucket wall 17 through an adjustable clevis, which permits accurate adjustment of the length of the link 66 so that, when the bucket is filled with water and the sidewall bulges outwardly, the link 66 is generally taut. It can be seen that the line 60 and links 64 and 66 locate the central hub portion 52 vertically in a manner generally similar to equivalent structure as shown in U.S. Pat. No. 5,560,429.

Figure 3:
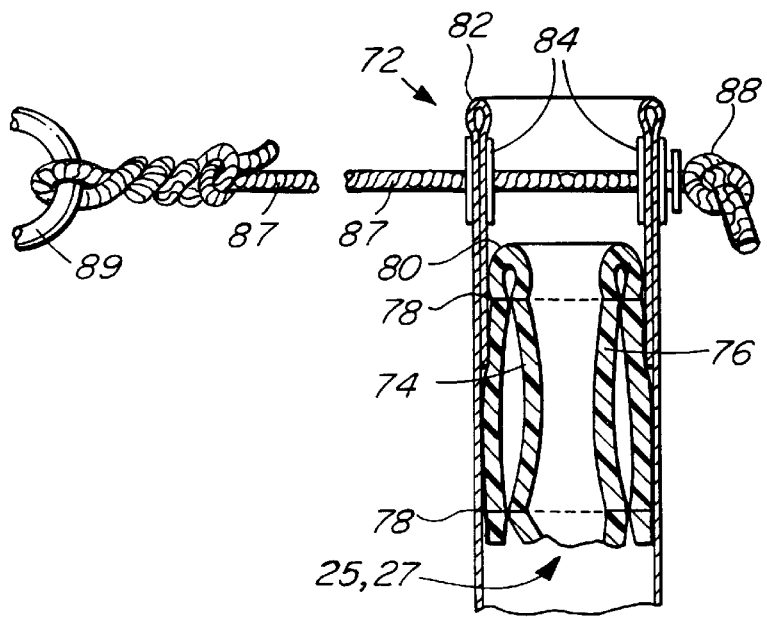
FIG. 3 is a simplified fragmented longitudinal section in a vertical plan through a closed outer dump valve according to the invention.

Referring again to FIG. 1, only one portion of the sleeve 27 of the outer dump valve 25 is shown and an opposite portion of the sleeve is essentially identical thereto. The outer dump valve has a proximal end portion 70 cooperating with the lower wall portion 22 of the outer bucket, and a distal end portion 72 which has a first sealing lip 74 extending therearound. While the distal and proximal end portions can be of similar diameters, i.e. for a cylindrical sleeve, to facilitate deployment the distal end portion can be slightly smaller than the proximal end portion so that the sleeve 27 tapers slightly as a truncated cone. Referring also to FIG. 3, the distal end portion 72 has a second sealing lip 76 disposed oppositely to the first sealing lip 74, the first and second lips being an integral ring of resilient soft gasket material such as "Neoprene" (tm). The strip of gasket material is folded to increase its thickness to improve sealing, and is secured to opposite faces of the sleeve 27 by stitches 78. Outer edges 80 of the sealing lips are spaced inwardly from a terminal edge 82 of the sleeve, the terminal edge having a relatively wide hem which increases stiffness of the distal end portion 72 of the sleeve. A row of reinforcing grommets 84 extends around the distal end portion between the terminal edge 82 and the outer edges 80 of the lips. Aligned pairs of grommets receive individual purse lines 87 which have proximal ends with knots 88 which cannot pass through the grommets, and distal ends connected to a purse ring 89 which draws the pairs of grommets and lips together when the ring is moved upwardly.

Referring again to FIG. 1, the purse ring 89 is supported by a trip line 92 which extends upwardly to the control head 30, and thus the lines 87 and 92 and the ring 89 serve as an outer dump valve actuator to control operation of the outer dump valve as will be described. A dump valve limiter link 93 extends between the ring 89, i.e. cooperating with the distal end of the dump valve, and a support cable 32, i.e. cooperating with the bucket wall, to limit downwards movement of the inner dump valve as will be explained. In summary, the outer dump valve actuator comprises a control line, i.e. the trip line 92, which cooperates with the distal end portion of the outer dump valve to draw the sealing lips into contact with each other to seal the distal end portion against leakage, and to position the distal end portion in a raised closed position.

With the exception of the two separate but connected lengths of opener restrainer links 64 and 66, the sequencer switch 47, and the inner bucket 14, the above description refers to a conventional single dump fire-fighting bucket as disclosed in U.S. Pat. No. 5,560,429. In the present invention, the inner bucket 14 provides the aforementioned advantages of two separate dumps and, if necessary, can be installed or "retro-fitted" to an existing single dump fire-fighting bucket to provide the advantages of the invention.

Figure 4:
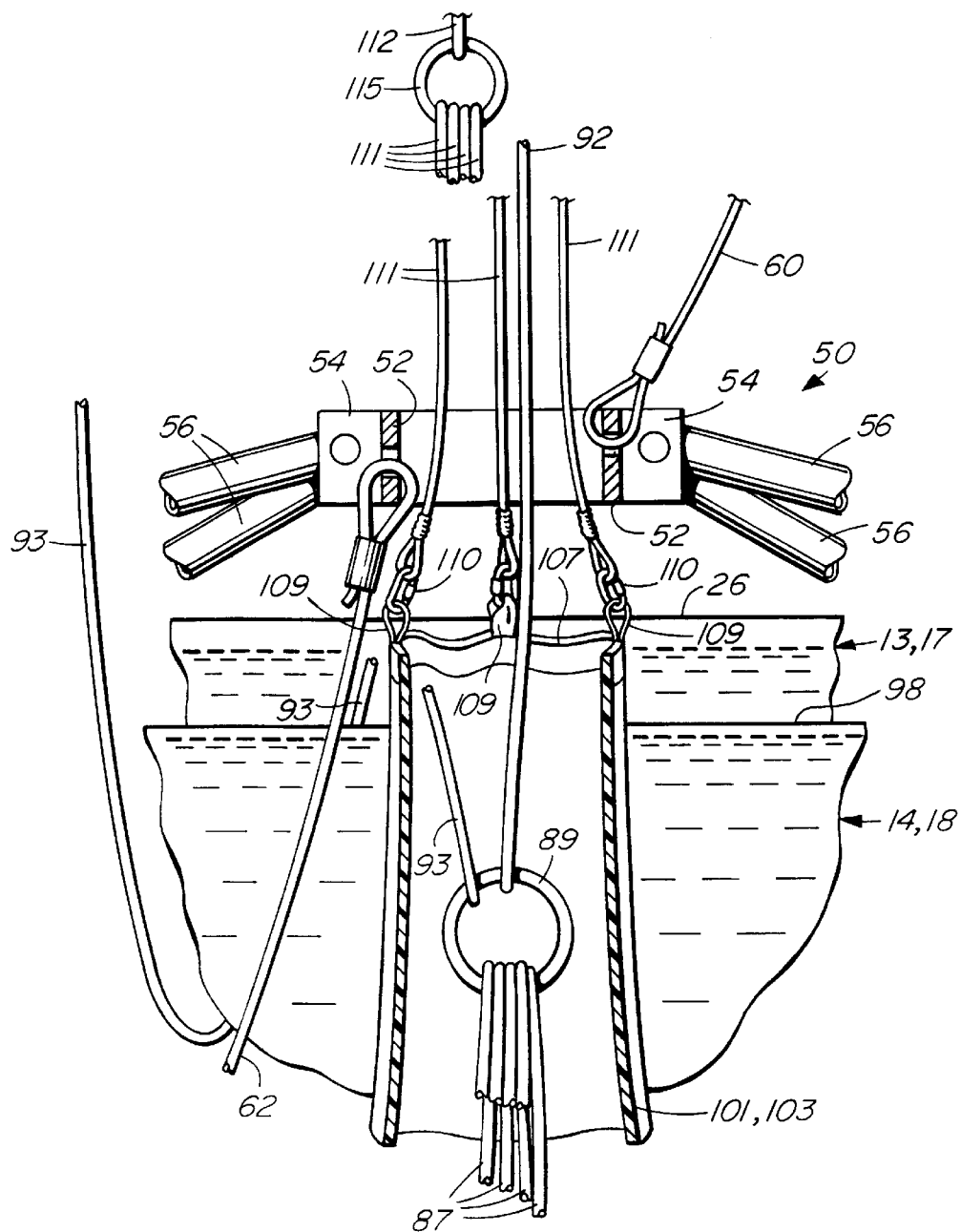
FIG. 4 is a simplified fragmented longitudinal section in a vertical plane through a closed inner dump valve according to the invention.

In FIG. 1, 2 and 4, the bucket wall 18 of the inner bucket has upper and lower wall portions 95 and 96, the upper wall portion having an inner rim 98 located slightly below the outer rim 26 and secured intermittently thereto around the circumference thereof as will be described. The inner bucket has an inner dump valve 101 which partially resembles the outer dump valve 25 and is located above the outer dump valve. The inner dump valve is a flexible sleeve 103 having a proximal end portion 105 cooperating with the lower wall portion 96 of the inner bucket, and a distal end portion 107 which provides a discharge opening of the inner dump valve. The inner bucket is considerably smaller than the outer bucket and thus has considerably less capacity. In the drawings as shown, the inner bucket has a capacity of approximately 50 percent of the total capacity of the outer bucket, although the difference in capacities could be typically between 30 percent and 60 percent. Thus a discharge opening of the sleeve 103 of the inner dump valve has a diameter less than the diameter of the flexible sleeve 27 of the outer dump valve 25.

As best seen in FIGS. 2 and 4, the distal end portion 107 of the sleeve has a plurality of looped webbing straps 109 extending therearound, the straps being connected to respective inner dump valve gathering lines 111 by screwed connectors or shackles 110, the lines 111 extending upwardly through the hub to connect to a gathering ring 115 connected to a trip line 112. The looped straps 109 provide a stronger connection than the grommets 84 used in the outer dump valve 25. The straps 109 are also preferable to grommets because only four straps 109 and four gathering lines 111 are used to draw the inner dump valve upwardly, and thus a greater load must be sustained by the straps than the grommets 84 used to close the outer dump valve 25. Clearly, reducing the number of gathering lines simplifies manufacturing and servicing, and reduces chances of fouling of any lines which pass through the central hub portion 52 of the rim opener.

In contrast with the relatively short sleeve 27 of the outer dump valve 25, the sleeve 103 of the inner dump valve 101 is sufficiently long to extend above the surface of water in the inner bucket, so that the distal end portion 107 is positioned above the water and does not leak. Also in contrast with the inner dump valve, the distal end portion 107 of the sleeve 103 is merely gathered together by the gathering lines 111 when the inner valve is closed, and there are no sealing lips to provide a water tight seal for water in the inner bucket. This is because the trip line 92 and the dump valve limiter link 93 pass upwardly through the sleeve 103 and thus would prevent sealing of the inner dump valve. As the outer bucket rim 26 extends higher than the inner rim 98, maximum level of water that can be contained within the bucket apparatus 10 is generally dependent on the outer bucket rim, which in ideal circumstances could be filled higher than the inner bucket rim. In practice, uncontrolled movements of water or difficult filling procedures cause spilling which results in less water being carried than the full capacity of the bucket apparatus, and consequently the inner bucket may have a higher water level than the outer bucket.

Thus, in summary, it can be seen that the trip line 92, which serves as a control line of the outer dump valve actuator, passes through the discharge opening of the inner dump valve. Also, the discharge opening of the inner dump valve can be positioned by the inner dump valve actuator, namely the trip line 112, above the inner rim of the inner bucket to prevent leakage therethrough.

Figure 5:
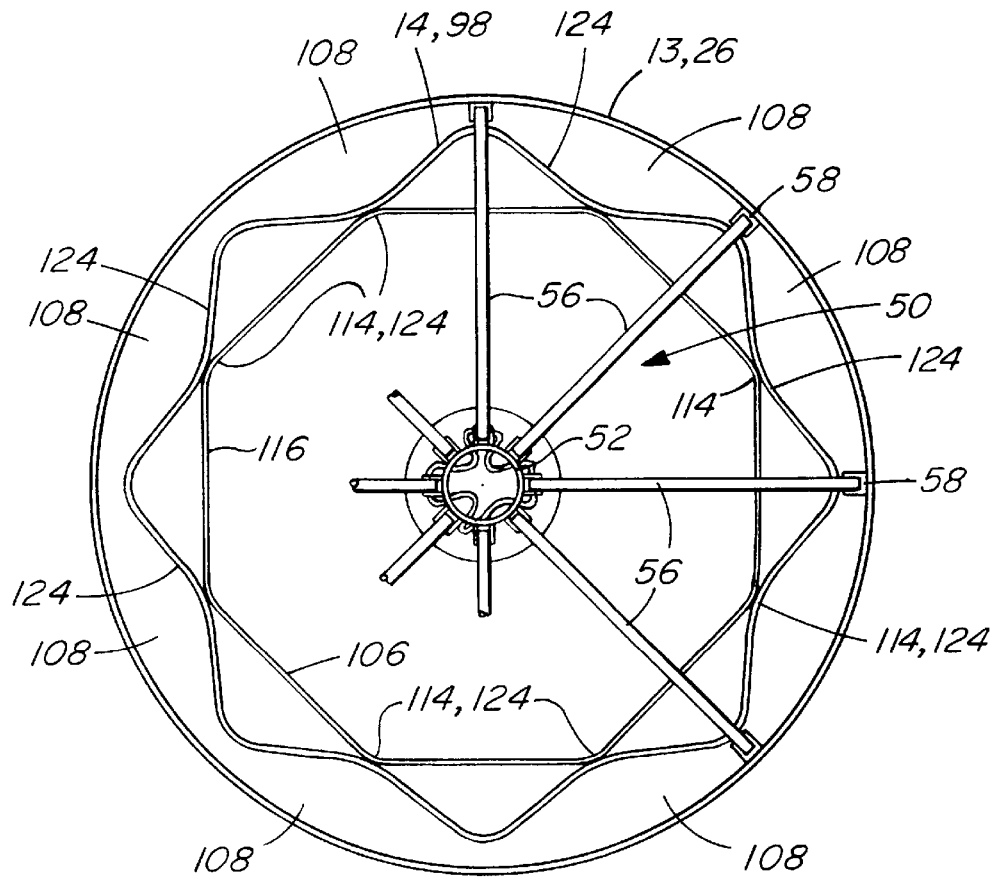
FIG. 5 is simplified fragmented top plan view of the bucket of FIG. 1.
Figure 6:
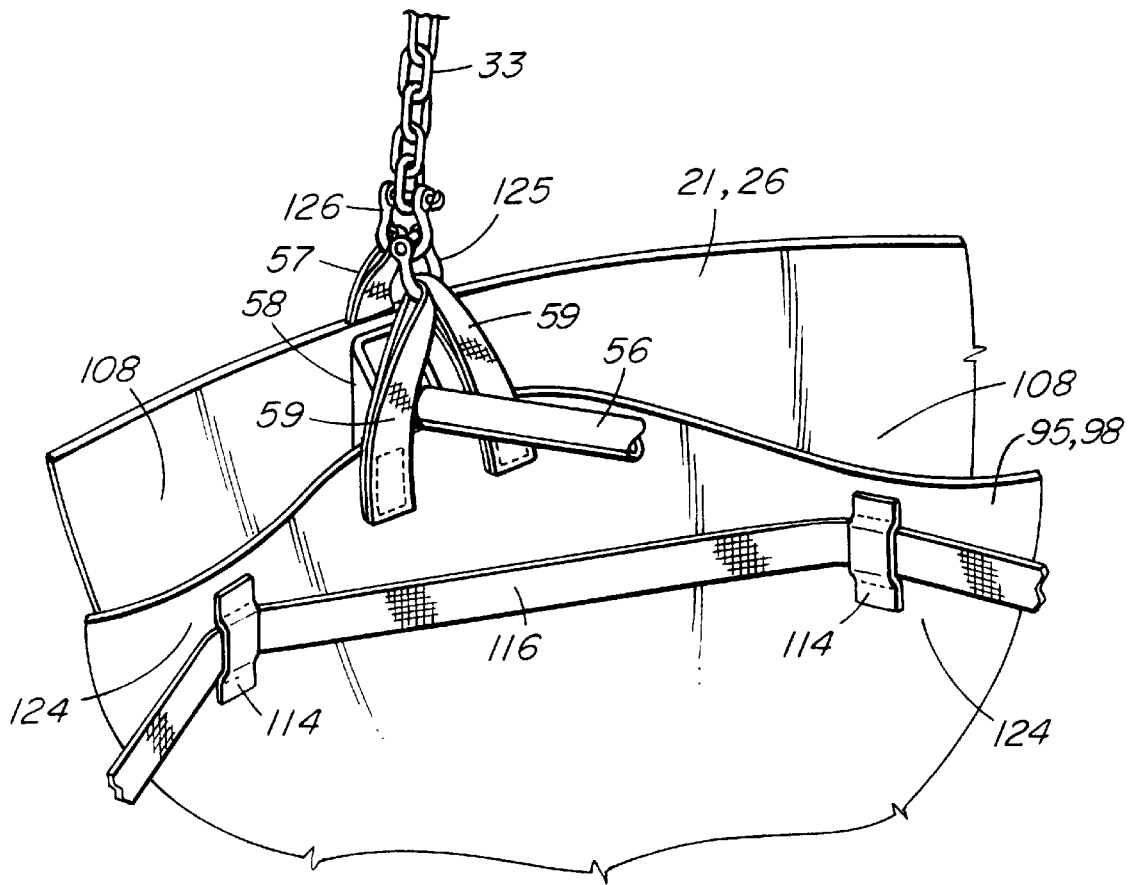
FIG. 6 is a simplified fragmented prospective of a connection between a support harness and inner and outer buckets of the invention, as seen at location "6" in FIG. 2.

FIGS. 2, 5 and 6

Referring to FIG. 2 and 6, the upper wall portion 95 of the inner bucket has a plurality of draw loop locators 114 which are circumferentially spaced around an inside face of the inner rim 98. A draw loop 116 passes through the draw loop locators 114 and has a circumference which is less than the circumference of the inner rim to distort the inner rim to produce a series of shallow, inwardly facing "waves" to produce clearances 108 between the inner bucket 14 and the outer bucket 13. The draw loop locators 114 are spaced between the rim connectors 58 of the outer rim, and thus are located on intermediate portions 124 of the upper wall of the inner bucket, and are relatively free of restraint by the straps 59. An inner cinch strap 120 passes through cinch strap locators 121 secured to an inner surface of the inner bucket wall 18 to adjust capacity of the inner bucket 14 similarly to the cinch strap 42.

In FIG. 5, it can be seen that the rim opener 50 has eight spokes 56 which provides eight rim connectors 58 to which the inner bucket 14 is secured as best seen in FIG. 6 although more spokes could be used in large buckets. In FIG. 6, a pair of the straps 59 extend upwardly from circumferentially spaced apart locations of the inner rim 98 of the inner bucket 14. One looped strap 59 is located on each side of the spoke 56 adjacent the rim connector 58, and upper ends of the straps 59 are connected together with a first screwed connector or shackle 125. The shackle 125 in turn is connected to a second screwed connector or shackle 126 which also passes through an adjacent looped strap 57 connected to the outer rim 26, thus securing the inner and outer buckets together. The shackle 126 in turn is connected to the short length of chain 33 or the equivalent fabric straps 34 extending around the outer rim 26 as seen in FIG. 1. Clearly, the inner bucket can be easily removed and reinstalled into the apparatus 10.

As seen in FIG. 5, when the draw loop 116 is made taut, intermediate portions 124 of the inner bucket are drawn inwardly as the draw loop assumes an octagonal shape. It can be seen that the intermediate portions of the inner bucket are spaced inwardly from the outer bucket to provide the clearances 108 therebetween which permits water to flow between the inner and outer bucket so as to fill the outer bucket as will be described.

In summary, it can be seen that the outer ends of the spokes are hinged to a first set of rim connectors which are circumferentially spaced apart around the outer rim of the outer bucket so as to hold the outer bucket open when the rim opener is deployed. In addition, the inner bucket cooperates with the circumferentially spaced apart rim connectors of the outer bucket so as to be opened simultaneously with the outer bucket, and to provide said clearances between the inner and outer buckets to permit filling of both buckets.

FIGS. 7 through 10

Figure 7:
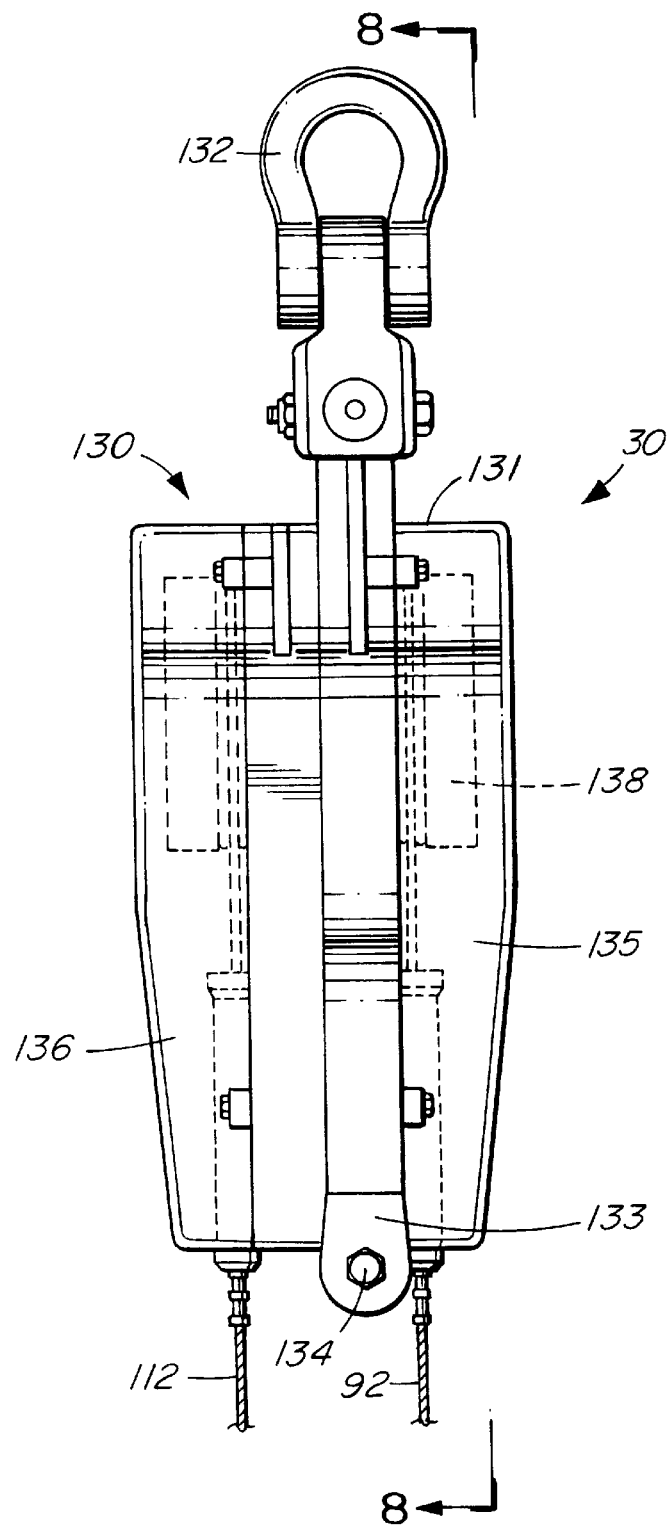
FIG. 7 is a simplified fragmented elevation of a control head according to the invention.
Figure 8:
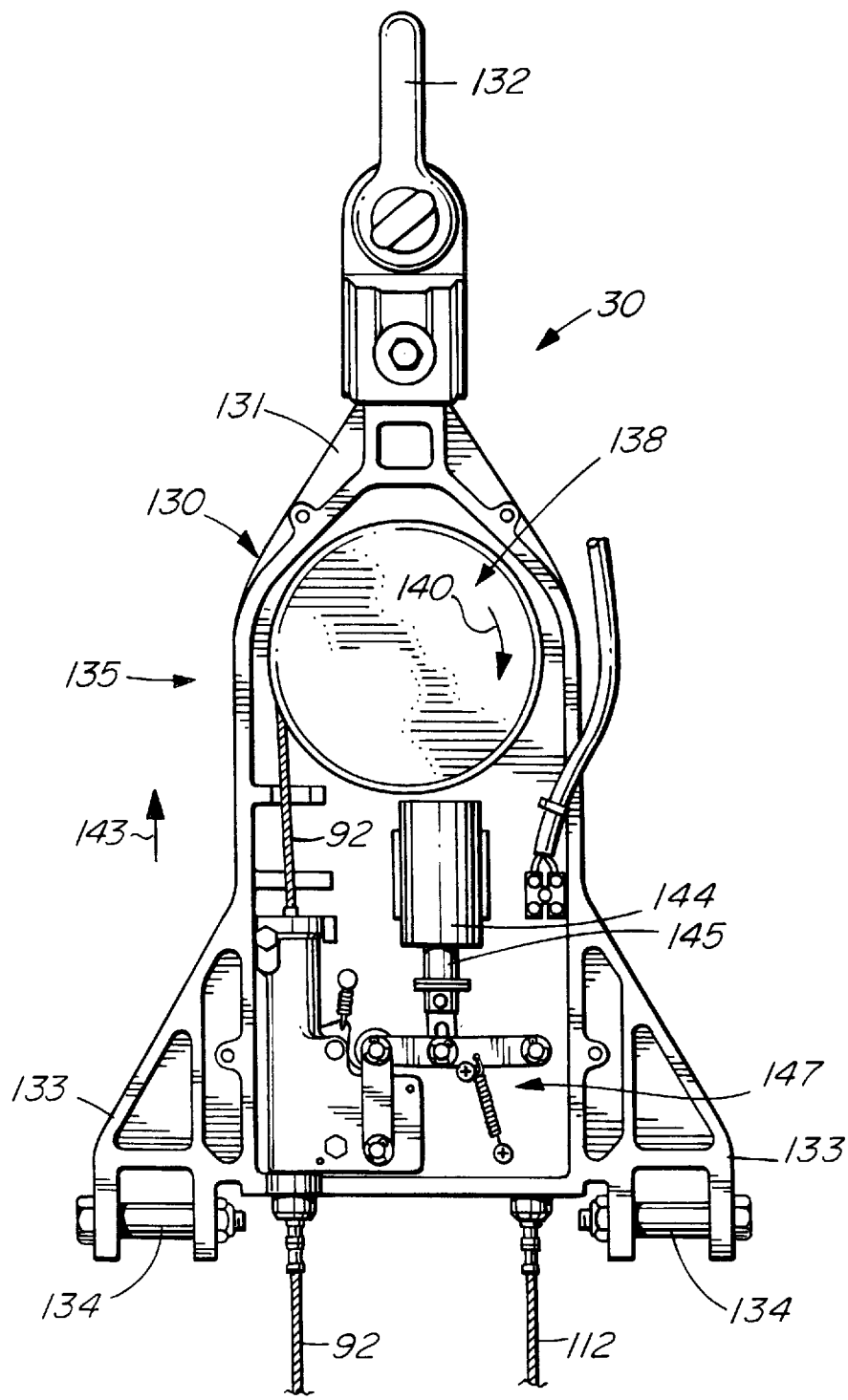
FIG. 8 is a simplified fragmented section on line 8—8 of FIG. 7 showing internal details of the control head.

Referring to FIGS. 7 and 8, the control head 30 has a casing 130 having an upper end 131 connected to a screwed connector or shackle 132 which is received on the external cargo hook of a helicopter, not shown. The casing 130 has a pair of similar connecting ears 133 extending from opposite sides to receive corresponding bolts 134 to which the support cables 32 of the harness 29 are secured, the cables not being shown. Clearly, other means of connecting the harness to the control head can be devised. The trip lines 92 and 112 for controlling the outer and inner dump valves respectively are shown extending downwardly from the casing 130 so as to cooperate with the bucket apparatus as previously described. The control head has two essentially identical halves, namely outer and inner dump valve control portions 135 and 136 which are stacked together to form a single unit as shown in FIG. 7. The control valve portions closely resemble equivalent control valve portions of a prior art control head which is used to control the operation of the buckets of the previously mentioned patents. Consequently, the outer dump valve control portion 135 only will be described as follows. The portion 135 has a rewind pulley 138 which is spring loaded to rotate the pulley in direction of an arrow 140, so as to wind the trip line 92 therearound, thus moving the line 92 upwardly in direction of an arrow 143. A solenoid 144 has a normally extended plunger 145 which cooperates with a latching mechanism 147 as will be described with reference to FIGS. 9 and 10.

Figure 9:
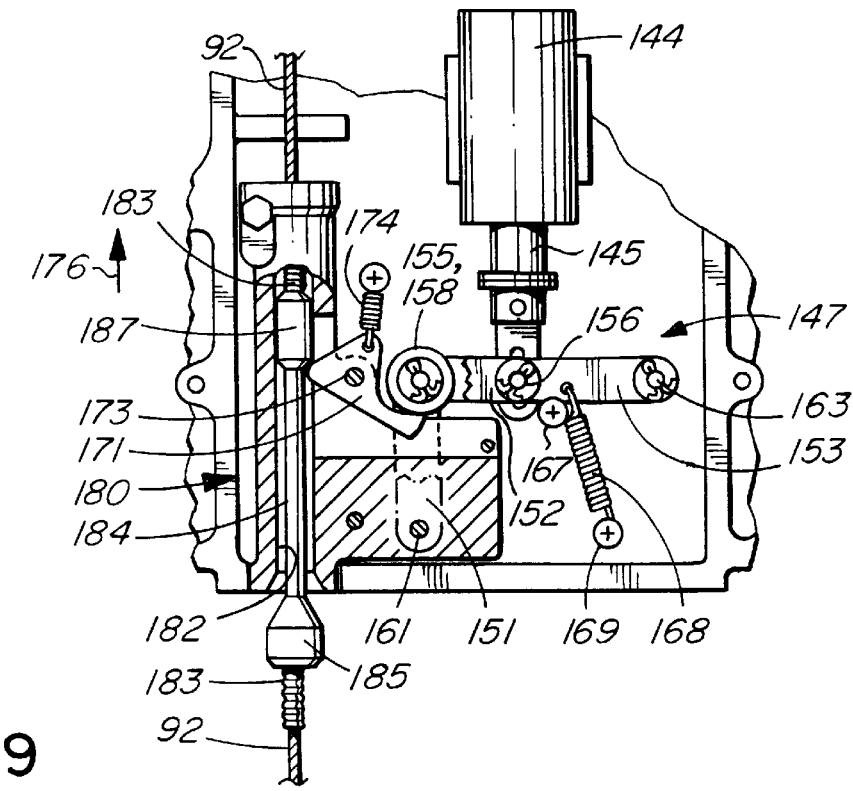
FIG. 9 is a fragmented section at enlarged scale showing details of a latching mechanism of the control head in a valve closed position.
Figure 10:
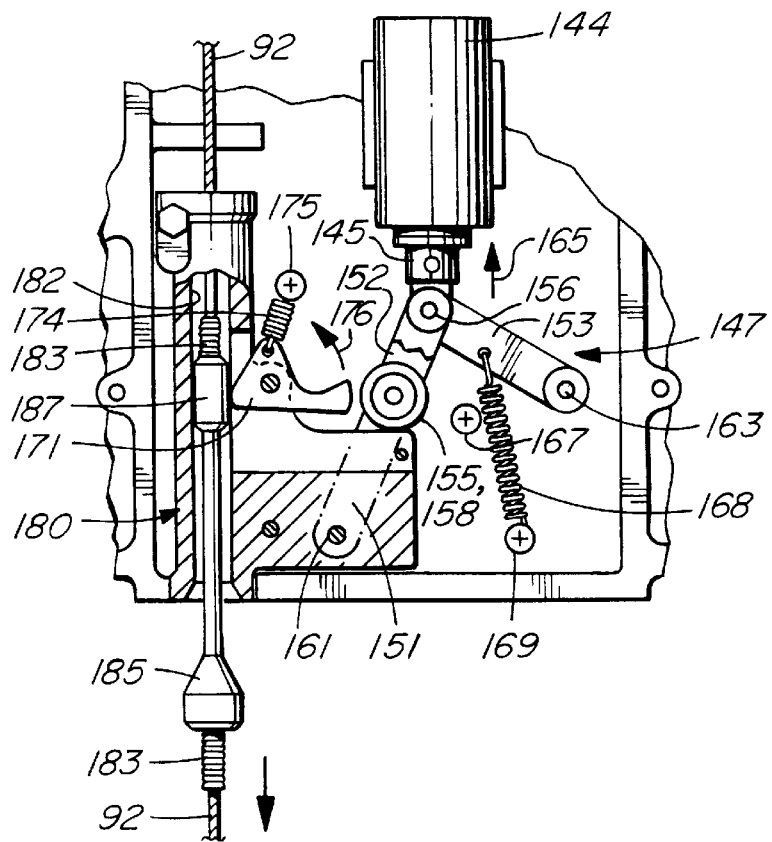
FIG. 10 is generally similar to FIG. 9 with the latching mechanism shown initiating a valve opening sequence.

Referring to FIGS. 9 and 10, the latching mechanism 147 comprises first, second and third links 151, 152 and 153 respectively, the link 152 being pinned at opposite ends with first and second pins 155 and 156 respectively to the first and third links 151 and 153. The pin 155 also has a roller bearing 158 journalled thereon serving as a cam follower, and the pin 156 journals the second and third links to an outer end of the plunger 145. Outer ends of the first and third links 151 and 153 are pinned by anchoring pins 161 and 163 respectively to the casing to permit the first, second and third links to assume a first position as shown in FIG. 9 when the plunger 145 is extended. In the first position, the second and third links 152 and 153 are slightly "over-centered downwardly" by the plunger 145, i.e. the links are non-aligned in a shallow V-shape. A tension coil spring 168 extends between the third link 153 and an anchor pin 169 secured to the casing so as to apply a downwards force to the link 153 tending to urge it into the first position shown in FIG. 9. A stop 167 interferes with the link 153 to prevent further downwards movement of the plunger and link, which could occur if the helicopter was subjected to severe turbulence. Without the stop, the plunger 145 could over-extend, which could cause the roller 155 to move to the right causing premature release as will be described.

The latching mechanism further includes a catch 171 which is hinged by a catch pin 173 to the casing, and a catch spring 174, secured by an anchor pin 175. The catch spring applies a force to the catch to align the catch after dumping, so that the roller bearing 158 can once again lock the catch in the position as shown in FIG. 9.

The control head also includes a line guide 180 having a vertical bore 182 which accepts the trip line 92 extending therethrough. The control head also includes a straight tube 184 through which the trip line passes, the tube carrying lower and upper stops 185 and 187 which are secured at opposite ends thereof. Swages 183 are secured to the trip line adjacent the stops so as to locate the tube and stops with respect to the trip line so as to control operation of the trip line as will be described. The upper stop 187 is a sliding fit within the bore 182, whereas the lower stop 185 has a conical upper end which is received in a complementary conical opening in the casing to prevent upwards movement of the shaft and line 92.

In FIG. 9, the catch 171 has a left hand end engaging the upper stop 187, and a right hand end engaged by the roller bearing 158, both of which apply downwards forces to the catch on opposite sides of the pin 173. The catch thus functions somewhat similarly to a "teeter-totter" to resist a downwards force on the trip line 92 due to weight of water acting on the dump valve. In this position, the spring 174 is essentially inactive.

In contrast, in FIG. 10 the latching mechanism 147 is shown in a second position an instant after initiating a dump sequence. The solenoid 144 is energised and the plunger 145 retracts which draws the roller bearing 158 off the right hand end of the catch 171. The catch is shown rotated in direction of an arrow 176 due to force from the upper stop sliding through the line guide 180 as the trip line 92 is drawn rapidly downwardly to release the dump valve. As the trip line moves downwardly, the rewind pulley 138 rotates in a direction opposite to the arrow 140, see FIG. 8, thus priming a spring of the rewind pulley for a return stroke as will be described. The dump valve limiter link 93 (FIGS. 1 and 4) limits downward travel of the dump valve to eliminate shock on the control head and prevents over-extension of the spring in the rewind pulley, thus reducing wear or breakage. It can be seen that, because the stop 167 prevents over-extension of the plunger 145 of the solenoid, the roller bearing 158 is prevented from advertently being released from the catch 171 as occurring in a normal intentional release described above.

When the dump valve is released, weight of the sleeve on the trip line 92 prevents the rewind pulley from drawing the line 92 upwardly in the return stroke, and thus the outer valve remains open initially. However, when deactivated, the solenoid plunger 145 extends and the spring 174 repositions the catch 171. It is noted that the rewind pulley has sufficient force to rewind the line 92 only when weight is taken off the line, e.g. supporting the sleeve when re-filling the bucket, which prevents the sleeve from starting to retract during a dump. During rewinding, the upwardly travelling upper stop contacts the catch 171, and the catch 171 shifts to permit the stop to pass upwardly, after which it assumes the position shown in FIG. 9, being located therein by the roller bearing 155. The control head has thus been reset, and the outer dump valve is now in a raised position for the bucket to be re-filled.

FIG. 11

Figure 11:
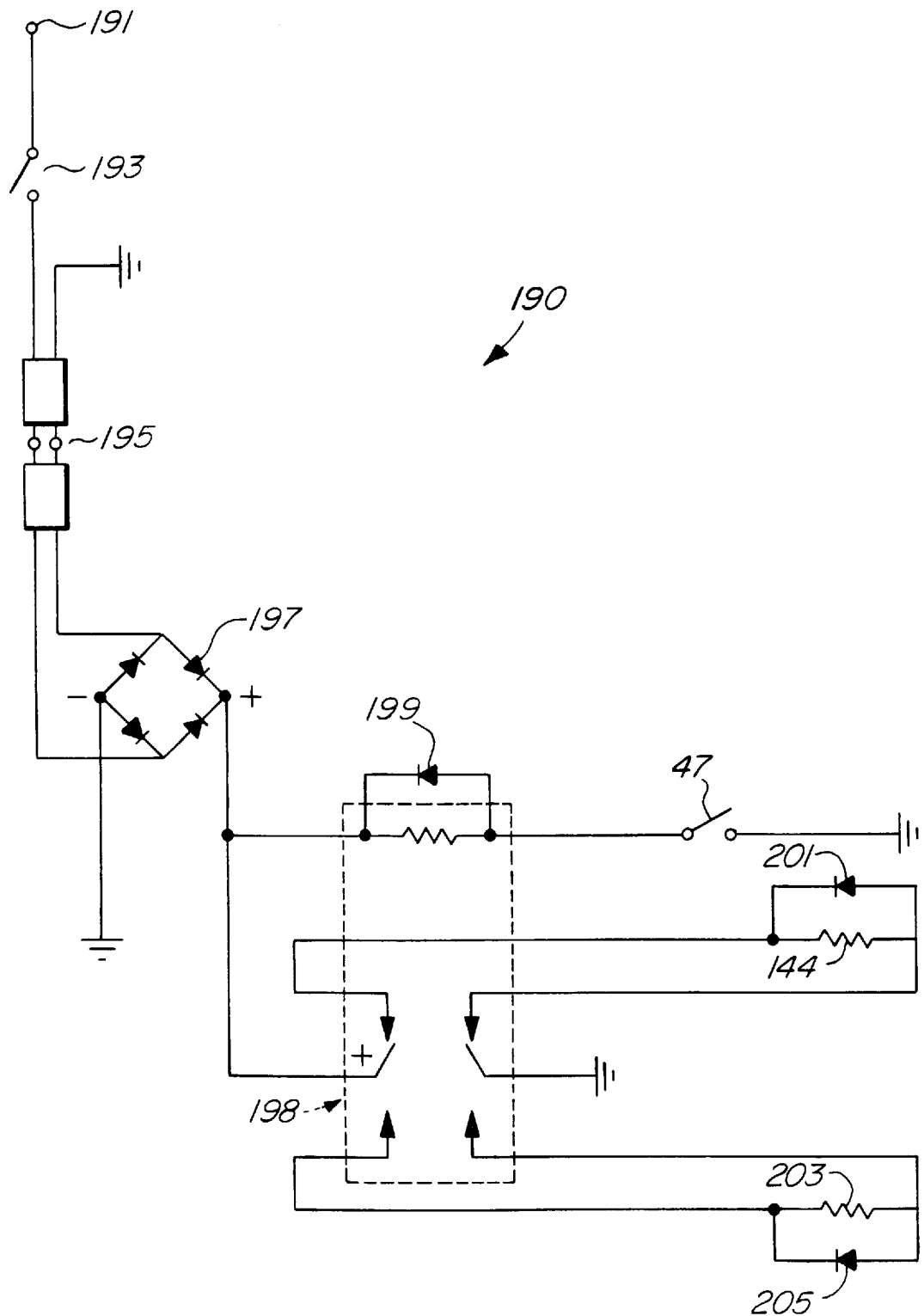
FIG. 11 is a simplified electrical schematic diagram showing electrical components associated with the control head.

An electrical circuit 190 controls actuation of the solenoid 144, and is controlled by an operator in the helicopter using a simple manual control having one manual switch to control operation of both the outer and inner dump valves. FIG. 11 shows the circuit not energized, with the buckets full with water so that the sequencer switch 47 is open. The electrical circuit is powered by a power source 191 and has a single valve release control, i.e. a normally open, push-button manual switch 193 for operation by the operator. The circuit has a breakaway plug 195 for release of the bucket from the helicopter in an emergency or for normal disconnection. The circuit includes a rectifier 197, a double-pole, double-throw (DPDT) relay 198 and first, second and third diodes 199, 201 and 205 connected as shown. The rectifier is a full wave bridge rectifier which will correct the polarity of the circuit should the breakaway switch be wired incorrectly. The valve sequencer switch 47 is connected in series with the first diode 199, which in turn is connected in parallel with coils of the relay. The second diode 201 is shown connected in parallel with the solenoid 144 which controls the outer dump valve 25. An inner dump valve solenoid 203 of the control portion 136 (FIG. 7) has the third diode 205 connected in parallel therewith as shown. The diodes 199, 201 and 205 are included to short circuit any back EMF produced when the coils of the relay or solenoids are de-energized, preventing arcing at the contacts of the relay or sequencer switches.

OPERATION

FIG. 11 and 12A through 12C

Figures 12A, 12B, 12C:
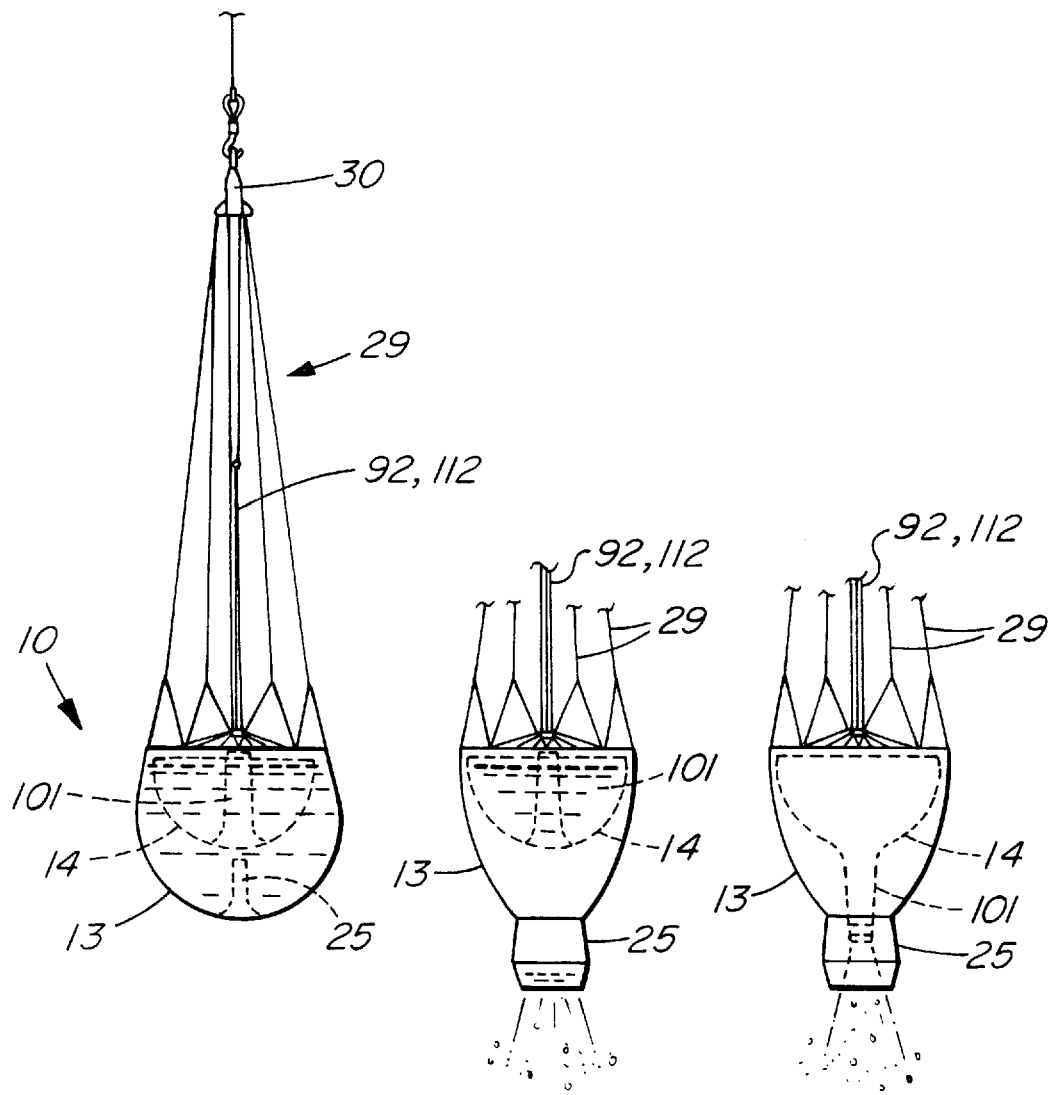
FIGS. 12A through 12C are sequence diagrams showing operation of both dump valves of the apparatus, the bucket shown full, discharging through the outer dump valve, and discharging through the inner dump valve respectively.

When the bucket apparatus 10 is filled with water, the inner and outer buckets 13 and 14 assume the shapes as shown in FIG. 12A, and the outer and inner valves 25 and 101 are held closed in respective raised position by respective trip lines 92 and 112 so as to prevent leakage therethrough.

Referring to FIG. 11, because there is water in the outer bucket, the sequencer switch 47 is open preventing energizing of the relay. When the push button switch 193 is momentarily closed by the operator, the rest of the circuit is energized, and because the relay 198 is in its normally closed position, the normally closed contacts energize the solenoid 144, which releases the outer dump valve.

In FIG. 12B, the outer dump valve 25 is shown released by releasing the trip line 92, which permits the sleeve 27 of the valve 25 to rapidly invert itself downwardly as shown, so as to dump the liquid held in the outer bucket, that is the liquid between the inner bucket and outer bucket. It can be seen that the inner bucket 14 remains unchanged from that shown in FIG. 12A, apart from slight distortion in shape.

In FIG. 11, when the outer bucket 13 has emptied, the sequencer switch 47 registers no water in the outer bucket, and the sequencer switch 47 now closes, thus permitting the relay to be energized. When the push button switch 193 is momentarily actuated again, power is supplied to the relay and the normally open contacts are now closed, so as to complete the circuit to the inner dump valve solenoid 203, which then actuates the inner dump valve.

In FIG. 12C, the inner dump valve 101 has been released by releasing the trip line 112 which permits the sleeve 103 of the valve 101 to invert itself and to pass through the outer dump valve 25 (which remains open) so as to discharge the water that was contained within the inner bucket. It can be seen that the length of the sleeve 103 of the inner valve is sufficiently long to pass into the proximal end of the outer valve, so as to essentially prevent water discharged from the inner bucket from hitting the outer bucket, thus eliminating shock loads on the helicopter.

The operation of the control head during release and resetting of the control head has already been described with reference to FIGS. 7 through 10.

ALTERNATIVES

Figure 13A:
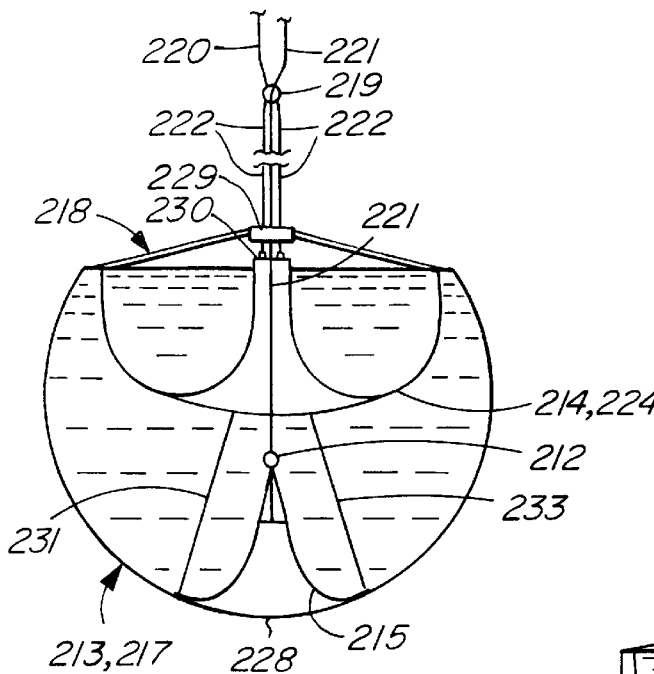
FIGS. 13A through 13C are sequence diagrams showing operation of an alternative "double-dump" bucket, the bucket being shown full, discharging through the outer dump valve, and discharging through the inner valve respectively, generally similarly to FIGS. 12A through 12C.
Figure 13B:
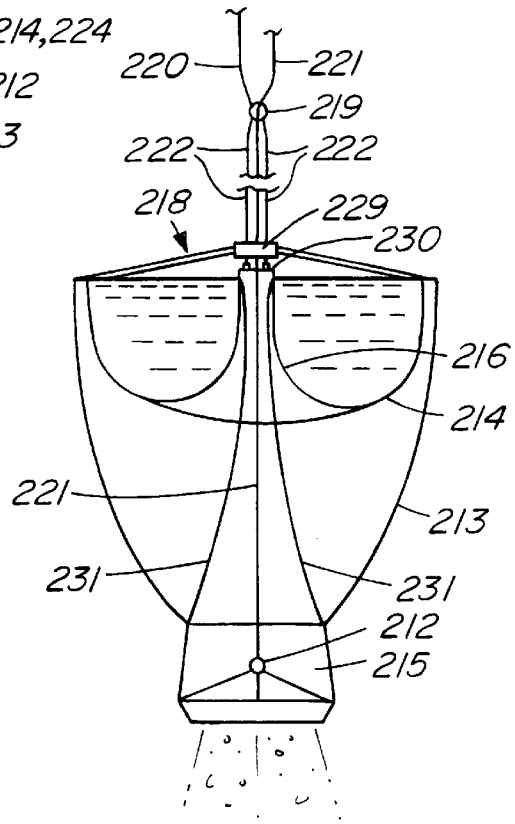
Figure 13C:
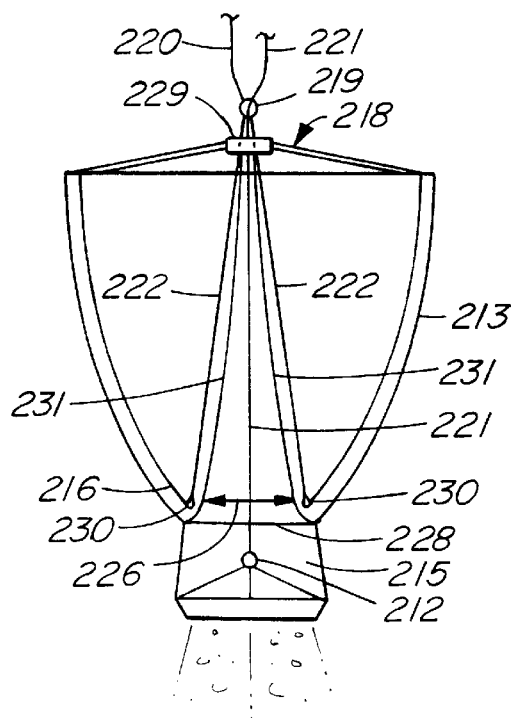

FIGS. 13A through 13C

A second embodiment of the invention 211 is an alternative "double-dump" bucket which has outer and inner buckets 213 and 214 with associated dump valves 215 and 216 respectively. The outer bucket 213 has a bucket wall 217, a rim opener 218 and is supported by a harness, not shown, which is generally similar to the harness 29. The valves 215 and 216 are controlled by trip lines 221 and 220 respectively which serve as dump valve actuators and control lines. The trip line 221 supports a purse ring 212 controlling non-designated purse lines of the dump valve 215. The trip line 220 supports a gathering ring 219 which controls gathering lines 222 of the dump valve 216.

The outer bucket 213 is essentially identical to the outer bucket 13 of FIGS. 1 through 6. In contrast, the inner bucket 214 differs from the bucket 14 by having a bucket wall 224 which is approximately equal in size and shape to the bucket wall 217 of the outer bucket 213 and has an inner rim supported adjacent the rim of the outer bucket as previously disclosed. Thus, circumferentially spaced portions of the inner rim are connected to adjacent portions of the outer rim by simple pinned connections which permit easy removal, and are generally equivalent to the connections between the inner bucket looped straps 59 and the rim opener 50 as described with reference to FIGS. 2 and 6. Also, as previously described, the inner bucket 214 has a draw loop, (not shown) equivalent to the loop 116 to produce clearances between the inner and outer bucket equivalent to the clearances 118 to permit filling of the outer bucket.

In contrast with the previous embodiment, the inner bucket wall 224 does not have a flexible sleeve corresponding to the flexible sleeve 103 of the inner bucket 14, but instead has a discharge opening 226, best seen in FIG. 13C, which is approximately equal to in size to a corresponding discharge opening 228 of the valve 215 of the outer bucket 213. Thus, if the bucket apparatus 211 were empty as seen in FIG. 13C, the bucket wall 224 of the inner bucket could lie adjacent the bucket wall 217 of the outer bucket, and the opening 226 would be adjacent the discharge opening of the outer bucket. The discharge opening of the inner bucket has a reinforced opening rim 230 which has four looped webbing straps, which are not shown but are similar and equivalent to the looped straps 109 of FIG. 4. The looped straps receive the respective inner valve gathering lines 222 which pass through the rim opener 218 to the ring 219 supported thereabove by the line 220. When the inner bucket 214 is to be filled, the ring 219 and gathering lines 222 are drawn upwardly so as to draw the opening rim 230 of the inner bucket to a position generally level with a rim of the outer bucket to prevent water passing therethrough. Similarly to the first embodiment, the trip line 221 for the outer valve passes through the discharge opening 226 of the inner bucket.

Also, in contrast with the first embodiment 10, the second embodiment 211 has two generally similar rim opener restrainers 231 which are links extending continuously from distal ends located on the outer bucket wall adjacent the outer dump valve, through the opening of the inner dump valve 216 to proximal ends of a central hub portion 229 of the rim opener 218. The length of the links of the restrainers 231 are selected so as to be taut when the bucket is empty as shown in FIG. 13C to prevent the rim opening from moving upwardly excessively.

In operation, when both the inner and outer buckets are filled as shown in FIG. 13A, the trip lines are raised and both valves are closed. Referring to FIG. 13B, the outer dump valve 215 has been released by releasing the trip line 221, so that liquid is discharged from the outer bucket 213 in the manner as previously disclosed as shown. The opening rim 230 of the inner bucket 214 is still supported by the trip line 220, and when the trip line 220 is released, the bucket wall 224 drops and rapidly expands outwardly to be against the bucket wall 217 of the outer bucket 213 and water is discharged directly through the outer dump valve 215. It can be seen that, when the inner bucket is released, some of the water contained therein falls freely through the space of the outer bucket and contacts the outer bucket wall, producing a shock load on the outer bucket which will be transferred to the helicopter. This is undesirable for the large size of buckets, and thus the alternative of FIGS. 13A through 13C is preferably used for the smaller buckets so as to reduce the shock load. Clearly, if a shock absorbing device were incorporated in the harness or on the cargo hook of the helicopter, the shock loads on the helicopter would be diminished.

Figure 14:
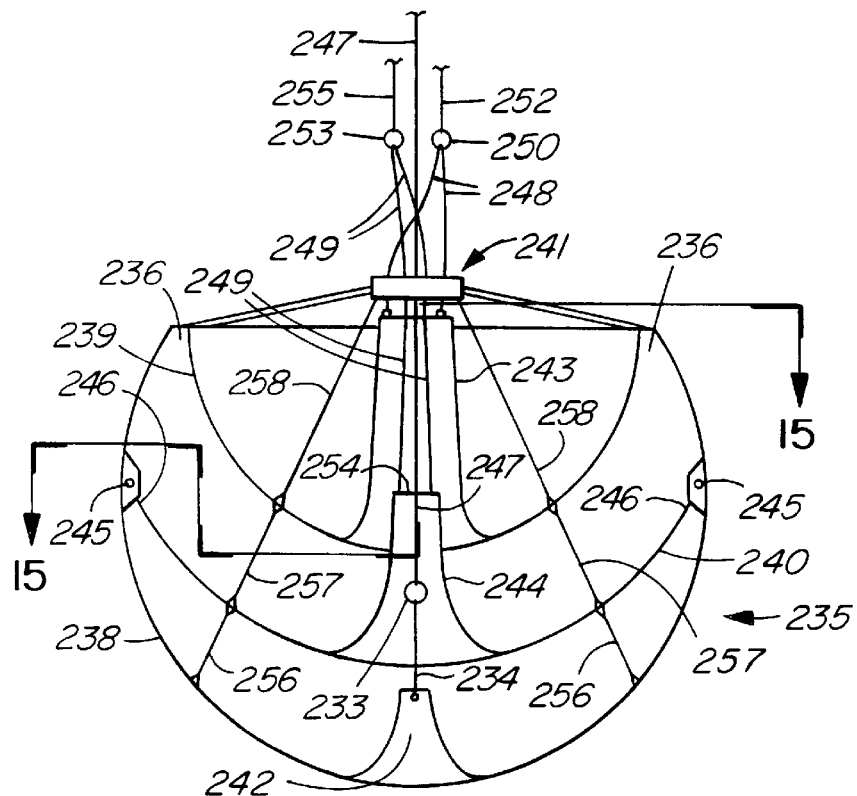
FIG. 14 is a simplified diagram of a "triple-dump" bucket according to the invention shown full.
Figure 15:
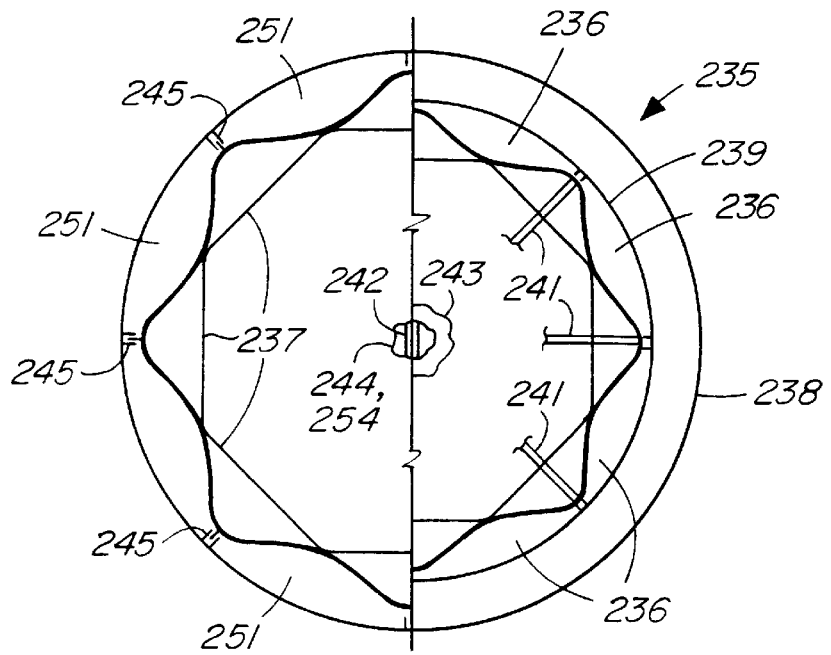
FIG. 15 is a simplified section on line 15—15 of FIG. 14 showing additional details of the "triple-dump" bucket.

FIGS. 14 and 15

A third embodiment of the invention is a "triple-dump" bucket assembly 235 which comprises an outer bucket 238, an inner bucket 239 and an intermediate bucket 240, the intermediate bucket being disposed beneath the inner bucket 239 and between the inner and outer buckets. The outer and inner buckets have outer and inner dump valves 242 and 243 respectively, which are generally similar to the outer and inner dump valves 25 and 101 of the first embodiment 10 of FIG. 1–6. The inner bucket 239 cooperates with a rim opener 241 in a manner similar to that described in FIGS. 1 through 6, and thus provides clearances 236 for water to pass between upper portions of the inner bucket and outer bucket for filling the intermediate and outer buckets.

The intermediate bucket 240 is generally similar to the inner bucket 239, but of somewhat larger diameter and has a rim 246 secured intermittently to the outer bucket 238 using brackets and pins 245 with taped loops, not shown, to permit easy removal of the intermediate bucket and to provide clearances 251 (for filling the outer bucket) in a manner generally similar to that shown with reference to the inner bucket 239 above. Clearly, as the rim opener 241 is not fitted adjacent the rim 246, simple alternate connections are used. In addition, a draw loop 237 extends around the rim of the intermediate bucket 240 to produce the clearances 251 for filling the outer bucket. The intermediate bucket has an intermediate dump valve 244 which is a sleeve which resembles the sleeve 103 of the inner dump valve 101 of the first embodiment 10. When the sleeve of the intermediate dump valve 244 is fully raised, a distal end 254 of the sleeve is slightly higher than the rim 246 of the intermediate bucket 240 as shown in FIG. 14 to avoid leakage therethrough. Thus, the distal end 254 of the intermediate dump valve 244 extends only to a position slightly above the rim of its own bucket, because if it were excessively long it could foul in the outer dump valve 242 during deployment. The inner and intermediate dump valves 243 and 244 have respective discharge openings of generally equal size.

Similarly to the first embodiment at least two rim opener restrainers are provided as follows. An outer rim restrainer 256 extends between the outer bucket 238 and the intermediate bucket 240, an intermediate rim restrainer 257 extends between the intermediate bucket 240 and the inner bucket 239, and an inner rim restrainer 258 extends between the inner bucket 239 and the rim opener 241. Adjacent ends of the outer rim restrainer 256 and the intermediate rim restrainer 257 are connected together through sealed connections mounted on opposite surfaces of the intermediate bucket 240. Similarly adjacent ends of the intermediate rim restrainer 257 and the inner rim restrainer 258 are connected together by similar brackets mounted on opposite surfaces of the inner bucket 239. Thus, the rim opener 241 is restricted against upwards movement by tension in the rim restrainers 256, 257 and 258.

The dump valves 242, 243 and 244 are controlled by respective outer, inner and intermediate trip lines 247, 248 and 255 respectively which serve as dump valve actuators or control lines. The trip line 247 cooperates with a purse ring 233 connected to purse lines 234 which seal the outer dump valve 242 as previously described.

Gathering lines 248 and 249 cooperate with the peripheries of the discharge openings of the inner and intermediate dump valves 243 and 244 respectively to draw the peripheries upwardly above the adjacent water surface similarly to previously described embodiments. The trip line 247 of the outer valve 242 extends upwardly through the aligned openings of the intermediate and inner dump valves 244 and 243 respectively. The gathering lines 249 of the intermediate valve 244 extend upwardly through the opening of the inner valve. The gathering lines 248 of the inner dump valve 243 are connected to a gathering ring 250 which is supported by the trip line 252 which extends upwardly to the control head. The gathering lines 249 of the intermediate dump valve 244 are connected to a gathering ring 253 which is supported by the trip line 255 extending upwardly to the control head. Clearly three trip lines and corresponding dump valve control portions are required to operate the three valves. The valves are operated in sequence, firstly the outer valve, then the intermediate valve, and then the inner valve.

Figure 16:
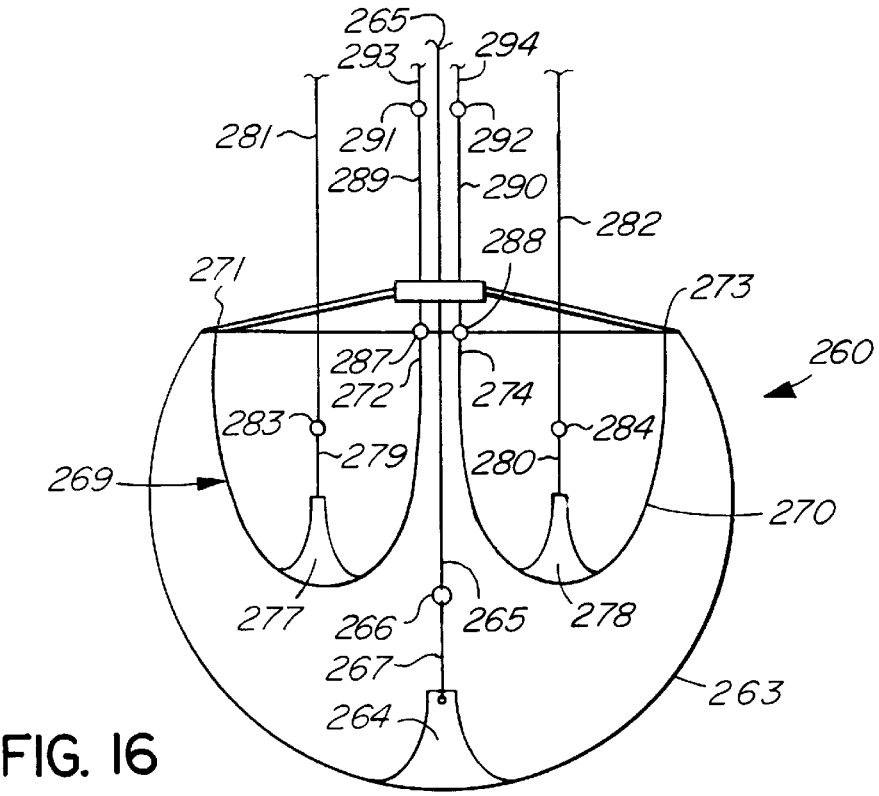
FIG. 16 is a simplified diagram of an alternative "triple-dump" bucket shown full.
Figure 17:
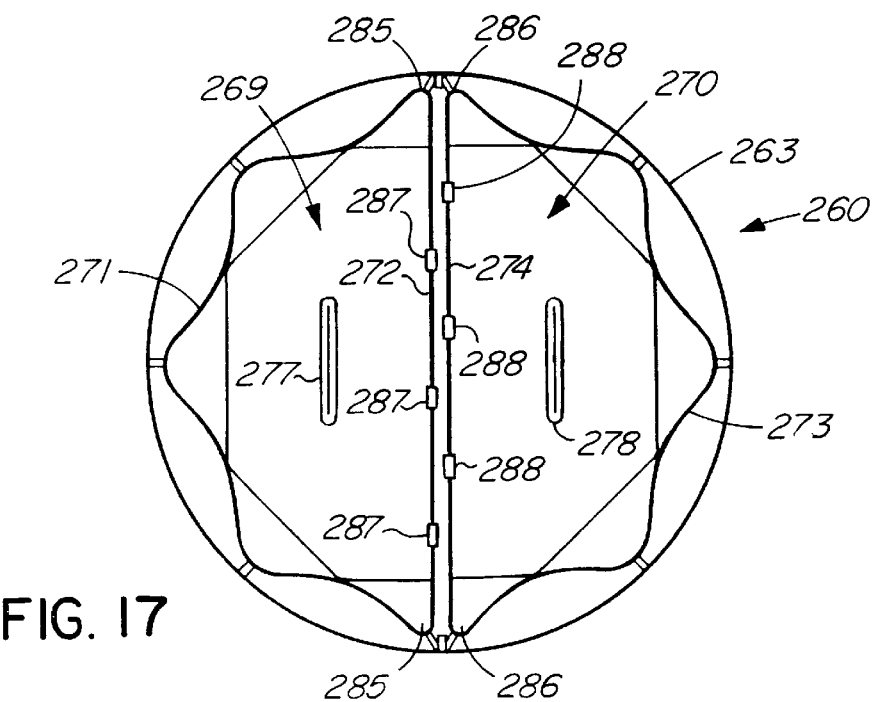
FIG. 17 is a simplified top plan of the alternative "triple-dump" bucket of FIG. 16.

FIGS. 16 and 17

A fourth embodiment of the invention is a "triple-dump" bucket assembly 260 which comprises an outer bucket 263 having an outer dump valve 264 controlled by a trip line 265. The line 265 supports a purse ring 266 connected to purse lines 267 similarly to the previously described embodiments. The embodiment 260 further comprises primary and secondary inner buckets 269 and 270, each inner bucket having respective bucket wall portions having respective inner rims extending therearound. The inner rim of the primary inner bucket 269 has distal and proximal rim portions 271 and 272 respectively, and the secondary inner bucket 270 has distal and proximal rim portions 273 and 274 respectively. The inner buckets 269 and 270 have lower wall portions cooperating with primary and secondary inner dump valves 277 and 278 respectively.

The dump valves 277 and 278 are generally similar to each other and have flexible sleeves extending to distal ends carrying resilient sealing lips, and thus are generally similar to the outer dump valve 25 of the embodiment 10 of FIGS. 1 through 6. Thus the distal ends of the dump valves 277 and 278 have a plurality of grommets, aligned pairs of which receive respective purse lines 279 and 280 which are connected to purse ring 283 and 284 respectively, which in turn are supported by primary and secondary trip lines or control lines 281 and 282 extending to the control head.

As two equally sized inner buckets are provided, the proximal rim portions 272 and 274 of the inner rims extend as approximate diameters across the outer bucket, and thus the inner buckets occupy sectors of about 180 degrees when viewed from above. The distal rim portions 271 and 273 of the inner rims of the buckets 269 and 270 are supported in a manner generally similar to the manner of supporting the inner rims of the inner buckets of the previously described embodiments. Outer portions 285 and 286 of the proximal rim portions 272 and 274 respectively are connected to the outer bucket generally as shown in FIG. 6. Intermediate portions of the proximal rim portions 272 and 274 are supported by a plurality of support lines 289 and 290 respectively which are connected to looped webbing straps 287 and 288 respectively which are spaced apart along the rim portions 272 and 274 respectively. The lines 289 and 290 are connected to support rings 291 and 292 respectively which are carried on main support lines 293 and 294 respectively which extend upwardly to the helicopter so as to support the intermediate portions of the proximal rim portions 272 and 274.

In operation, following the procedure as previously described, the outer dump valve 264 is released first, after which either of the primary or secondary dump valves can be released so as to discharge water from the primary and secondary inner buckets. Clearly, the support lines 289 and 290 remain taut until the inner buckets have been emptied.

The embodiment 260 discloses two equally sized inner buckets, which would have a combined capacity of typically between 30 per cent and 60 per cent of the capacity of the outer bucket. In alternatives, three or more inner buckets could be provided so as to provide multiple dumping possibilities, with each bucket having a shape when viewed from above dependent on the number of inner buckets. For example, if three equal inner buckets were used, angles between proximal rims of the inner buckets would be 120 degrees when viewed from above.

What is claimed is:

1. A suspendible bucket apparatus comprising:
   (a) an outer bucket having a bucket wall with upper and lower wall portions, and an outer dump valve, the upper wall portion having an outer rim and the lower wall portion cooperating with the outer dump valve,
   (b) an inner bucket having a bucket wall with upper and lower wall portions, and an inner dump valve, the upper wall portion having an inner rim and the lower wall portion cooperating with the inner dump valve, the inner bucket being located within the outer bucket so that at least a portion of the inner rim is spaced inwardly from the outer rim to provide clearance therebetween for filling the outer bucket, and the inner dump valve is located above the outer dump valve,
   (c) an outer dump valve actuator cooperating with the outer dump valve to control actuation of the outer dump valve, and
   (d) an inner dump valve actuator cooperating with the inner dump valve to control actuation of the inner dump valve.

2. The apparatus as claimed in claim 1 in which:
   (a) the outer dump valve and the inner dump valve actuators are operable independently of each other and sequentially so that the outer dump valve is opened before the inner dump valve.

3. The apparatus as claimed in claim 1 in which:
   (a) the outer dump valve is a flexible sleeve having a proximal end portion cooperating with the lower wall portion of the outer bucket, and a distal end portion which is sealable to prevent leakage of liquid therethrough, and
   (b) the inner dump valve has a discharge opening which is positionable within the inner bucket to prevent leakage therethrough.

4. The apparatus as claimed in claim 3 in which:
   (a) the distal end portion of the outer dump valve has a pair of sealing lips which can be drawn into mutual contact with each other to seal the distal end portion against leakage, and
   (b) the outer dump valve actuator has a control line which cooperates with the distal end portion of the outer dump valve to draw the sealing lips into contact with each other, and to position the distal end portion in a raised closed position.

5. The apparatus as claimed in claim 4 in which:
(a) the control line of the outer dump valve actuator passes through the discharge opening of the inner dump valve, and
(b) the discharge opening of the inner dump valve can be positioned by the inner dump valve actuator above the inner rim of the inner bucket to prevent leakage therethrough.

6. The apparatus as claimed in claim 5 in which:
(a) the discharge opening of the inner dump valve is a circular opening defined by a periphery, and
(b) the inner dump valve actuator comprises a plurality of trip lines cooperating with the periphery of the discharge opening to position the opening above the inner rim of the inner bucket to prevent leakage therethrough.

7. The apparatus as claimed in claim 3 further characterized by:
(a) the bucket walls of the inner and outer buckets being flexible to permit folding thereof, and
(b) a rim opener to open the buckets for deployment, the rim opener cooperating with at least one of the rims of the buckets to open the buckets to permit filling thereof.

8. The apparatus as claimed in claim 7 in which:
(a) the rim opener has a central hub portion and a plurality of spokes, the spokes having inner ends hinged to the central hub portion, and outer ends hinged adjacent to at least one rim of one of the buckets, the spokes having equal lengths such that, when the said rim is essentially fully opened, the spokes are disposed generally radially of each other.

9. The apparatus as claimed in claim 8 in which:
(a) the outer ends of the spokes are hinged to a first set of rim connectors which are circumferentially spaced apart around the outer rim of the outer bucket so as to hold the outer bucket open when the rim opener is deployed, and
(b) the inner bucket cooperates with the circumferentially spaced apart rim connectors of the outer bucket so as to be opened simultaneously with the outer bucket and to provide said clearance between the inner and outer buckets to permit filling of both buckets.

10. The apparatus as claimed in claim 9 further comprising:
(a) a draw loop cooperating with a second set of rim connectors which are circumferentially spaced apart around the inner rim, the draw loop having a circumference which is less than the circumference of the inner rim to distort the inner rim to produce the said clearances between the inner and the outer buckets for filling the outer bucket.

11. The apparatus as claimed in claim 7 further comprising:
(a) an opener restrainer cooperating with the rim opener and at least one bucket to limit upwards movement of the hub with respect to the bucket.

12. The apparatus as claimed in claim 11 in which the opener restrainer comprises:
(a) at least one inner restrainer link being connected to extend between the hub and the lower wall portion of the inner bucket, and
(b) at least one outer opener restrainer link being connected to extend between the inner bucket and the outer bucket, the outer opener restrainer link having an upper end generally adjacent a lower end of the inner opener restrainer link, the said upper and lower ends being connected to opposite surfaces of the inner bucket.

13. The apparatus as claimed in claim 3 in which:
(a) the inner bucket is smaller than the outer bucket, and
(b) the inner dump valve is a flexible sleeve having a proximal end portion cooperating with the lower wall portion of the inner bucket, and a distal end portion which provides the said discharge opening which has a diameter less than the diameter of the flexible sleeve of the outer dump valve, the inner dump valve being positionable to discharge liquid into the outer dump valve with negligible contact of discharged liquid on the lower wall portion of the outer bucket.

14. The apparatus as claimed in claim 3 in which:
(a) the bucket wall of the inner bucket is approximately equal in size to the bucket wall of the outer bucket, and
(b) the discharge opening of the inner dump valve is a circular opening approximately equal in size to a corresponding opening in the outer bucket adjacent to the proximal end portion of the flexible sleeve of the outer dump valve.

15. The apparatus as claimed in claim 3 further comprising:
(a) an intermediate bucket disposed beneath the inner bucket and between the inner and outer buckets, the intermediate bucket having an intermediate dump valve having a discharge opening positionable within the intermediate bucket to prevent leakage therethrough, and
(b) an intermediate dump valve actuator cooperating with the intermediate dump valve to control actuation of the intermediate dump valve.

16. The apparatus as claimed in claim 15 in which:
(a) the outer dump valve actuator is a trip line passing upwardly through openings of the intermediate and inner dump valves, and
(b) the intermediate dump valve actuator is a trip line passing upwardly through the opening of the inner dump valve.

17. The apparatus as claimed in claim 3 in which:
(a) the inner bucket is a primary inner bucket which is located within an upper portion of the outer bucket, and the inner rim thereof has distal and proximal rim portions, and the apparatus further comprises:
(b) a secondary inner bucket having a bucket wall with upper and lower wall portions, and a secondary inner dump valve, the upper wall portion having an inner rim with distal and proximal rim portions and the lower wall portion cooperating with the secondary inner dump valve, the primary and secondary inner buckets being located side-by-side within the upper portion of the outer bucket so that the proximal portions of the inner rims of the primary and secondary inner buckets are generally adjacent to each other, and at least some distal portions of the said inner rims of the primary and secondary inner buckets are spaced inwardly from the outer rim of the outer bucket to provide the clearances therebetween for filling the outer bucket.

18. The apparatus as claimed in claim 3 further comprising:
   (a) a dump valve limiter link cooperating with the distal end portion of the outer dump valve and the bucket wall to limit downwards movement of the distal end portion with respect to the bucket wall.

19. The apparatus as claimed in claim 1 further comprising:
   (a) a valve sequencer which ensures that the inner dump valve is opened after the outer dump valve is opened.

20. The apparatus as claimed in claim 19 in which:
   (a) the valve sequencer cooperates with the outer bucket to detect when the outer bucket has been emptied to permit opening of the inner dump valve.

21. The apparatus as claimed in claim 20 in which:
   (a) the valve sequencer is an electrical switch which is responsive to a pre-determined minimum water level in the outer bucket.

22. The apparatus as claimed in claim 1 in which the inner and outer dump valve actuators comprise:
   (a) inner and outer dump valve trip lines, and
   (b) a control head having inner and outer dump valve control portions cooperating with the inner and outer dump valve trip lines, each valve control portion having a release latch which releases the respective trip line to open the respective valve, and a rewind pulley to rewind the respective trip line to close the valve.

23. An inner bucket for attachment to an outer bucket of a suspendible bucket apparatus, the outer bucket having a bucket wall with an outer rim and an outer dump valve; the inner bucket comprising:
   (a) a bucket wall with upper and lower wall portions, and an inner dump valve, the upper wall portion having an inner rim and the lower wall portion cooperating with the inner dump valve, the inner bucket being locatable within the outer bucket so that at least a portion of the inner rim of the inner bucket is spaced inwardly from the outer rim of the outer bucket to provide a clearance therebetween for filling the outer bucket, and the inner dump valve is locatable above the outer dump valve.

* * * * *